(12) United States Patent
Von Arb et al.

(10) Patent No.: US 7,569,780 B2
(45) Date of Patent: Aug. 4, 2009

(54) SENSING RF AND EM INTERFERENCE OF A FORCE-MEASURING DEVICE AND ADJUSTING OPERATION ACCORDINGLY

(75) Inventors: Hans-Peter Von Arb, Greifensee (CH); Jean-Christophe Emery, Zürich (CH); Daniel Reber, Madetswil (CH); Cyrill Bucher, Uster (CH); Stefan Buehler, Schwerzenbach (CH); Hansruedi Kuenzi, Greifensee (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/927,773

(22) Filed: Oct. 30, 2007

(65) Prior Publication Data

US 2008/0110681 A1    May 15, 2008

(30) Foreign Application Priority Data

Nov. 11, 2006 (EP) ................... 06123898

(51) Int. Cl.
G01R 29/26 (2006.01)
G01G 23/00 (2006.01)
H04B 17/00 (2006.01)
G06F 3/14 (2006.01)

(52) U.S. Cl. ................ 177/210 R; 340/666; 455/67.11; 455/67.13; 455/115.3; 324/613

(58) Field of Classification Search ............. 177/210 R, 177/210 EM, 211, 212, 229; 324/613; 455/67.11, 455/67.13, 115.3; 340/666
See application file for complete search history.

(56) References Cited

U.S. PATENT DOCUMENTS

| 4,332,174 | A | * | 6/1982 | Suzuki et al. .......... 73/862.633 |
|---|---|---|---|---|
| 4,413,527 | A | | 11/1983 | Sugiura et al. |
| 4,619,337 | A | * | 10/1986 | Behrend et al. ......... 177/210 R |
| 4,775,020 | A | | 10/1988 | Nishiyama |
| 4,836,293 | A | * | 6/1989 | Gebo et al. ..................... 177/1 |
| 4,852,673 | A | * | 8/1989 | Asai et al. ................ 177/25.18 |
| 4,858,711 | A | * | 8/1989 | Kunz .......................... 177/212 |
| 4,878,552 | A | * | 11/1989 | Gebo et al. .................. 177/212 |
| 5,684,428 | A | | 11/1997 | Nomura et al. |
| 5,723,826 | A | * | 3/1998 | Kitagawa et al. ............ 177/211 |
| 5,869,788 | A | * | 2/1999 | Gordon et al. .............. 177/124 |
| 5,998,742 | A | * | 12/1999 | Liu et al. .............. 177/210 EM |
| 6,330,450 | B1 | * | 12/2001 | Wallstedt et al. ............ 455/447 |
| 6,463,268 | B2 | * | 10/2002 | Tomiyama .................. 455/302 |
| 7,266,348 | B2 | * | 9/2007 | Watabe ..................... 455/67.11 |
| 2005/0136843 | A1 | * | 6/2005 | Watabe ..................... 455/67.11 |

FOREIGN PATENT DOCUMENTS

EP          0886126 A1    12/1998

* cited by examiner

Primary Examiner—Randy W Gibson
(74) Attorney, Agent, or Firm—Standley Law Group LLP

(57) ABSTRACT

A force-measuring device (100) with at least one housing (20) has an interior space and at least one force-measuring cell (110) installed therein. At least one parameter characterizing an existing high-frequency electromagnetic field is determined by a sensor (50) arranged in the interior space or a sensor arranged outside of the housing, the sensor being adapted for detecting high-frequency electromagnetic fields. After an electromagnetic field is detected and compared to a threshold value, a response action of the force-measuring device is triggered if the detected parameter value exceeds the threshold value.

25 Claims, 5 Drawing Sheets

SENSING RF AND EM INTERFERENCE OF A FORCE-MEASURING DEVICE AND ADJUSTING OPERATION ACCORDINGLY

CROSS-REFERENCE TO RELATED APPLICATIONS

This application claims a right of priority under 35 USC §119 from European patent application 06 123 898, filed 11 Nov. 2006, the content of which is incorporated by reference as if fully recited herein.

TECHNICAL FIELD

The disclosure relates to a method of monitoring and/or determining the condition of a force-measuring device wherein the latter has at least one housing containing an interior space and at least one force-measuring cell installed in the interior space of the at least one housing, and further has an electronic portion for measuring and/or evaluating a signal; and it also relates to a force-measuring device operable to carry out the method.

BACKGROUND OF THE ART

In view of the environments in which they are used which are in some cases very hard to control, many force-measuring devices, in particular gravimetric measuring instruments such as for example balances used in particular in the laboratory or in production facilities, or retail store scales, thermogravimetric instruments, measuring instruments for the gravimetric determination of moisture content, weighing modules for storage tank installations and reactor vessels, weighing modules and installations of multiple weighing modules in filling- and packaging lines, and—likewise—torque-measuring devices and accelerometers are protected by effective measures against non-ionizing types of radiation, in particular electromagnetic fields. These protective measures include among other things that the force measuring devices are adapted to the environments in which they are used in conformance with specific regulatory requirements in regard to radiation resistance and the like, as stated for different classes of exposure in the norm standards EN45501 or IEC61326.

For example, force-measuring cells for weighing modules are installed in metallic enclosures made of steel. The force-measuring cells enclosed in housings of this kind work problem-free as long as the housing keeps the radiation effects which compromise the measuring signal sufficiently away from the force-measuring cell and the measuring electronics or, in other words, prevents high-frequency electromagnetic fields from penetrating into the interior of the housing.

However, in situations where the gravimetric measuring instruments, weighing modules or balances are exposed to exceptionally high field strengths, it could still happen in some cases that certain high-frequency electromagnetic fields could penetrate through the smallest openings and gaps into the interior of the housing and compromise the measurement accuracy of the weighing modules to a noticeable degree.

The errors caused in the measurement results could lead to inaccurate weighing processes. If the measuring device is incorporated in an industrial installation with a high degree of automation, a disturbance of the measuring device could even lead to defective products.

In the case of a retail store scale that is used for the selling of merchandise, a customer could be charged a price that is either too low or too high if a product is weighed with an inaccurate or completely wrong weighing result.

It could happen that as a result of a manipulation error and/or inattention with telecommunications equipment, high-frequency electromagnetic fields penetrate into the interior of the housing and increase the radiation density in the interior space of the housing to such a degree that parts of the force-measuring cell or the components of the signal-processing portion or of the measurement electronics portion are compromised in their measuring accuracy. The term "telecommunications equipment" in this context encompasses a multitude of possible devices that are based on the principle of electromagnetic radio transmission, such as mobile telephones, cordless telephones, radio communications equipment, wireless data transmission, RFID devices, etc.

It is further conceivable that someone might want to change the measurement result of a force-measuring device through intentional manipulation by means of high-frequency radiation.

It is therefore an objective to propose an improved method for monitoring and/or determining the condition of a force-measuring device, and to also propose a force-measuring device capable of operating under the improved method.

SUMMARY OF THE DISCLOSED EMBODIMENTS

This objective is attained with a method and a force-measuring device possessing the features specified in the appended claims.

In a method for monitoring and/or for determining the condition of a force-measuring device wherein the latter has at least one housing containing an interior space and at least one force-measuring cell installed in the interior space of the at least one housing, and further has an electronic measuring- and/or signal-processing portion which can also be located outside of the housing, there is at least one sensor arranged in the interior space of the housing, and/or at least one sensor arranged outside of the housing, for the detection of high-frequency electromagnetic fields. By means of this sensor at least one parameter is determined which characterizes a high-frequency electromagnetic field when such a field is present; at least one value of the parameter thus determined is compared to at least one threshold value, and when the at least one threshold value is found to be exceeded, a response of the force-measuring device is triggered.

The term "electromagnetic field" is used here with a general meaning that also includes electromagnetic radiation, in particular of the type emitted by telecommunications equipment.

To a user of the force-measuring device, the method offers the advantage that in cases where high-frequency electromagnetic fields of exceptionally high field strength or in particular of potentially interfering frequencies are present, it can identify a factor that influences the force-measuring device and block the output of an erroneous measuring result, and it can in some cases give information about the presence of a malfunction. Consequently, this prevents that a force measurement, in the case of scales in particular a weighing, is performed which will lead to a wrong measuring result. This applies in particular to the case where the value of the measured parameter, in particular the field strength, exceeds a threshold value that can be prescribed. A user of the force-measuring device is given a possibility to recognize the problem and, if necessary, to eliminate it in order to arrive at a correct measuring result. In one method, the at least one sensor is used to determine electromagnetic fields in the frequency range of telecommunication equipment, wherein the parameters that can be measured include the frequency, the frequency range and/or the field strength of the high-frequency electromagnetic fields.

In a preferred embodiment, the force-measuring device includes a computer unit and a memory unit, where the computer unit executes a program in which the value of the measured field strength is compared to at least one threshold value which can be preset and changed in the memory unit and/or in the computer unit. The measured value can in particular be stored in the memory unit for further processing in the computer unit. The force-measuring device preferably includes a time clock which can be accessed by the computer unit, wherein the program can assign a time value to each measurement value and store the value pair in the memory unit. This makes it possible for stored values in general to be traced back in time in regard to events that could potentially have caused problems. If for example a service technician evaluates a time sequence of field strength values or investigates how the values of the measured strength depend on the frequency or on a frequency range of the electromagnetic fields, it becomes possible to broaden the scope of the traceability, whereby information can be obtained about the environment of the force-measuring device and, if necessary, measures can be initiated for the elimination of the problems-causing factors.

The term "computer unit" is meant to encompass all signal-processing elements, such as analog circuits, digital circuits, integrated circuits, processors, computers and the like which are operable to compare the sensor signals generated by the sensor to values that have been previously stored or set in the computer unit. These vales, in particular maximum values, threshold values and usage limits can be based on regulatory references such as national or international norm standards, they can have been determined by comparison measurements, or they can have been specified by the manufacturer of the force-measuring device. If necessary, the force-measuring device can also have more than one computer unit; for example, there can be an individually dedicated computer unit for each installed sensor.

If the force-measuring device includes an output unit, in particular a display screen of an indicating- and operating unit and/or at least one light-emitting diode and/or a printer, the method preferably includes a step in which the output unit delivers a signal which depends on the measured value of the parameter that characterizes the high-frequency electromagnetic field. Consequently, a user of the force-measuring device is always informed about the environmental conditions in regard to high-frequency electromagnetic fields.

The term "output unit" stands for any transmission-, reporting- and warning systems based on analog or digital working principles which are capable of representing the sensor signals generated by the sensor and/or an output signal of the computer unit through appropriate means such as sound, light, vibrations, electrical signals, electromagnetic pulses, numerical outputs and the like or to transmit such signals to other instruments such as for example further output units, higher-level systems, terminals and the like. The output unit can therefore also be a transponder or transmitter which sends the sensor signals and/or output signals for example to a portable instrument. The output unit can deliver a warning to the user, transmit the event to a memory unit, or even send an alarm message directly to the manufacturer or its service representative for example through the Internet.

In a case where the at least one threshold value has been exceeded, one or more repeat measurements can be next to take place, in particular if the force-measuring device or a computer unit connected to it ranks the value of the parameter characterizing the high-frequency magnetic field as sufficient to influence the stability of the measuring signal. Alternatively or simultaneously, an alarm can be initiated and/or a measuring process can be interrupted and/or blocked. It is also possible for an operation-readiness indicator to turn off, as a further possible response of the measuring electronics or of the force-measuring device. In regard to traceability, it is of particular advantage if the value of the parameter characterizing the high-frequency electromagnetic field is stored together with a time value into a log file in the memory unit.

If in calibration-capable force-measuring devices, in particular in balances, a calibration is pending, the calibration is not to be executed if a threshold value is exceeded at that point in time, but will only be carried out after the value in question has subsequently returned below the threshold.

In an advantageous step of the method, which serves as a function check for the at least one sensor, the sensor signal transmitted by the sensor to the computer unit is checked at least periodically in the computer unit by comparing it to verification values and verification tolerance values that are stored in the memory unit. If a discrepancy with these verification values or a departure from the prescribed verification tolerance values is found, the event is registered and transmitted to an output unit as an erroneous measurement. This increases the safety of the method.

A variety of solutions are conceivable to determine the at least one parameter characterizing a high-frequency electromagnetic field, if such a field is present. A signal can in particular be tapped off from the electronic measurement portion and/or the electromagnetic field strength inside or outside the housing can be measured and/or a signal can be tapped off from a cable connection, preferably of an electrical power cord or of a data transmission cable.

In an advantageous further developed embodiment of the method there is at least one additional sensor, in particular a temperature sensor, available in addition to the at least one sensor serving for the detection of high-frequency electromagnetic fields. The value determined with the further sensor can now be correlated to the parameter value characterizing a high-frequency electromagnetic field and can be considered together with the crossing of the threshold value for an assessment of an action to be taken in the electronic measurement portion.

Under a special concept it is also possible to use any signal or plurality of signals of the force-measuring device or of the measurement and/or processing electronics by themselves for the detection of high-frequency electromagnetic fields, since the latter will in most cases of interference superimpose themselves on the signals of the force-measuring device, so that a specific physical sensor is unnecessary. With this possibility in mind, a sensor serving for the detection of high-frequency electromagnetic fields should be understood in a general sense of the term.

Under a further aspect, it is further possible to register the time profile of the force-measuring signal in a past time interval, and a parameter value determined from this can be considered together with the crossing of the threshold value for an assessment of an action to be taken in the electronic measurement portion.

A second, preferably lower threshold value can be stored in the computer unit as a modifiable value in addition to the threshold value that triggers an action of the measurement electronics, wherein a warning signal is issued on an output unit when the second threshold value is exceeded.

Other aspects relate to a force-measuring device that is suitable for carrying out the method, which has at least one housing with an interior space and at least one force-measuring cell installed in the interior space of the at least one housing, and which further has an electronic measuring- and/or processing part. This force-measuring device is equipped with at least one sensor installed in the interior space of the housing and/or at least one sensor arranged outside of the housing for detecting high-frequency electromagnetic fields.

This sensor is preferably connected to the measuring- and/or processing electronics wherein, if a value in excess of at least one pre-definable threshold value is found by the sensor which serves to detect high-frequency electromagnetic fields, a response action of the force-measuring device can be initiated.

In a preferred embodiment of the force-measuring device, the latter is equipped with a computer unit as well as a memory unit, wherein the computer unit is operable to execute a program which, if a value in excess of at least one pre-definable threshold value is found by the sensor which serves to detect high-frequency electromagnetic fields, initiates a response action of the force-measuring device and/or stores the measured value in the memory unit for further processing.

The sensor serving for the detection of high-frequency electromagnetic fields can be configured as an electrical circuit for tapping off a signal of the measurement electronics and/or in the form of a broad-band and/or narrow-band electromagnetic field sensor or of an antenna, and/or in the form of an inductive or capacitative tapping-off loop and/or an antenna arranged around a cable, in particular a power supply cable supplying the force-measuring cell and/or the measurement electronics, or around a connector cable.

The sensor can be installed in particular inside the housing on the inside wall of the force-measuring cell housing, or on the force-measuring cell itself, or also for example on the circuit board of the signal-processing circuitry. With preference, the sensor is placed in the immediate vicinity of the components that are sensitive to electromagnetic radiation. For example in the case of systems based on electromagnetic force compensation, the place for the sensor could be in immediate proximity to the coil, it could be a part of the coil or the coil itself, or it could also be the position-sensor element of a device based on electromagnetic force compensation.

In an advantageous further developed embodiment of the force-measuring device, it is envisaged that in addition to the at least one sensor serving for the detection of high-frequency electromagnetic fields, a further sensor is arranged in the interior space of the housing or at the housing wall for the detection of line power peaks occurring in a power supply that supplies the force-measuring cell. In addition to the at least one sensor serving for the detection of high-frequency electromagnetic fields, there can now also be at least one further sensor arranged in the interior space of the housing or at the housing wall for the detection of further parameters, in particular the temperature.

In a further advantageous embodiment, the computer unit and/or an output unit is connected to the at least one sensor through wireless or wire-bound communication.

In an advantageous further developed embodiment, the at least one sensor serving for the detection of high-frequency electromagnetic fields is of a type that includes a memory module and/or a measurement converter.

The sensors of the force-measuring device which serve for the detection of high-frequency electromagnetic fields can be of a configuration where a memory module and/or a measurement converter and/or a transmitter is incorporated in each sensor.

BRIEF DESCRIPTION OF THE DRAWINGS

The details of the method and of the force-measuring device will become evident from the description of the embodiments that are illustrated in the strongly simplified schematic drawings, wherein.

DETAILED DESCRIPTION

Figure 1:
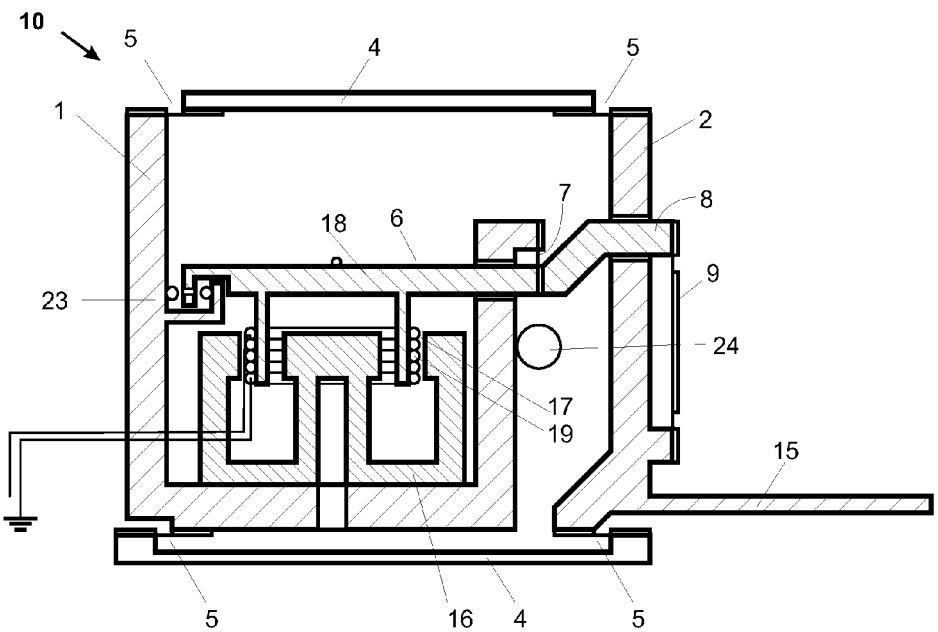
FIG. 1 illustrates in a side section view the principle of a force-measuring cell based on electromagnetic force-compensation.

In a strongly simplified schematic view, FIG. 1 illustrates a force-measuring cell 10 of a type that is suitable for use in the field of weighing technology, in particular in a balance, which operates according to the principle of electromagnetic force compensation. The force-measuring cell 10 includes a force-transmitting mechanism with a parallel-guiding system that has a stationary part 1 and a vertically displaceable load-receiving part 2, wherein the parts 1 and 2 are constrained for guided movement relative to each other by being connected through flexure pivots 5 to a pair of guide members 4. The load-receiving part 2 has a cantilevered arm 15 serving to receive a load that is to be measured. The normal component of the force produced by a load is transmitted from the load-receiving part 2 through a coupler element 9 to the short arm 8 of the lever 6. The lever 6 is supported by means of a flexure fulcrum 7 on a portion of the stationary part 1. The force-measuring cell 10 further includes a cup-shaped permanent magnet system 16 which is rigidly connected to the stationary part 1 and which has an air gap 17. A coil 19 is positioned in the air gap 17, held by the longer arm 18 of the lever 6. A compensation current of a magnitude that depends on the force acting on the lever 6 flows through the coil 19. The position of the lever 6 is measured by an electro-optical measuring device 23 which is connected to a feedback servo circuit that regulates the compensation current in response to the arriving measuring signals in such a way that the lever 6 is always held in the same position or, after a change in the load, is returned to the same position. A broad-band sensor 24 serving to detect high-frequency electromagnetic fields is arranged on the force-measuring cell 10 for the purpose of measuring high-frequency electromagnetic fields which could possibly penetrate from the outside and reach that location. If a field strength of excessive magnitude is detected, i.e. if the field strength exceeds a threshold value that can be predefined, it is thus possible to trigger a response action of the balance.

Figure 2:
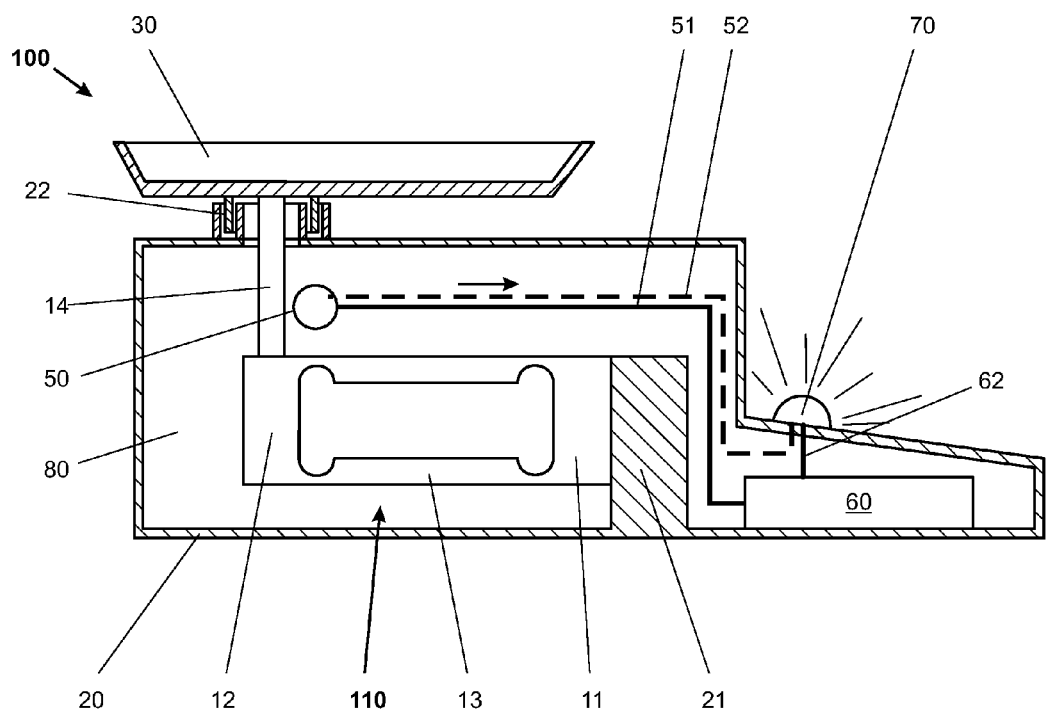
FIG. 2 is a side section view of a force-measuring device in the form of a balance with a housing that has an interior space and with a force-measuring cell arranged in the housing, wherein the interior space includes at least one sensor operable for carrying out the method.

FIG. 2 schematically illustrates a force-measuring device 100 in a sectional view, specifically a balance. A force-measuring cell 110 includes a stationary portion 11 and a load-receiving portion 12 which are connected to each other by a mid-portion 13. The force-measuring cell 110 is arranged in the interior space 80 of a housing 20 and its stationary portion 11 is rigidly connected to the housing 20 by way of the support 21 which is solidly attached to the housing. A load-receiver 30 in the form of a weighing pan which is arranged outside of the housing 20 is connected through a force-transmitting rod 14 to the load-receiving part 12 of the force-measuring cell 110 inside the interior space 80. The force-transmitting rod 14 enters the housing 20 through a passage opening 22 with contact free clearance. The passage opening 22 is configured in such a way that the penetration of high-frequency electromagnetic radiation is as much as possible prevented or at least strongly reduced. Further, at least one sensor 50 is arranged in the interior space 80, serving for the detection of high-frequency electromagnetic fields, wherein the sensor 50 measures at least one parameter of the high-frequency electromagnetic field. In particular, this parameter can represent the electromagnetic field strength and/or the frequency. A sensor signal corresponding to the measured value is sent through a computer-unit connection 51 to a computer unit 60 for further processing, and/or through an output connection 52 to an output unit 70 which is shown here as a light-emitting diode. The computer unit 60 is connected through the computer-unit output connection 62 to the output unit 70, transmitting to the latter the output signals generated by the computer unit 60. The output unit 70 can be arranged either directly on the exterior surface of the housing 20, or separate from the housing 20, or also installed inside the housing, provided that the design of the housing 20 (permeable to sound, transparent) allows the output signal to be heard or seen. Symbols or warning signals that are specifically tailored to the nature of the communication or warning to be delivered can enhance the communication to a person. It is thus conceivable to use commonly known pictograms such as for example graphic road signs, or symbols specifically created to represent the warning that is to be communicated. By varying the frequency of blinking visual indications or also be varying the sound volume and pitch frequency of audible output means it is possible to vary the level of importance of the warning or communication. Each of the connections 51, 52, 62 in the embodiment of FIG. 2 can be either a cable connection such as a signal cable, a bus system or the like, or a wireless connection.

As soon as a parameter of the interior space 80, in this example the field strength of high-frequency electromagnetic radiation, either changes or exceeds a predefined permissible threshold value, a response action of the balance is triggered. This action can take place by means of the computer unit 60 or directly in the electronic measuring- and/or processing part of the balance, of which the computer unit can also be a part. In a case where a weighing result is about to be registered, an action in response to a crossing over a predefined threshold value can entail that the measurement is repeated, as the electronic measuring system of the balance will find a lack of stability or a considerable underload or overload associated with the measurement value as first determined. It is also possible that a measurement is repeated more than once, at least over a certain acceptable length of time, but only until the measured field strength has receded to a value below the threshold value. If the aforementioned acceptable length of time is exceeded or the measured parameter value is too high, the measuring process can be interrupted and/or blocked and/or an operation-readiness indicator can be turned off. The value of the measured field strength, and especially its profile as a function of frequency, is stored together with a time value in a log file of a memory unit of the computer unit. This allows the data to be traced back in time.

As a further action of the balance, specifically of the electronic measuring and/or processing portion, a sensor signal or an output signal is transmitted to the output unit 70 where it is appropriately indicated. This can take the form of an acoustic signal, an optical signal such as a blinking light, or a warning or notice represented on a display panel.

Figure 3:
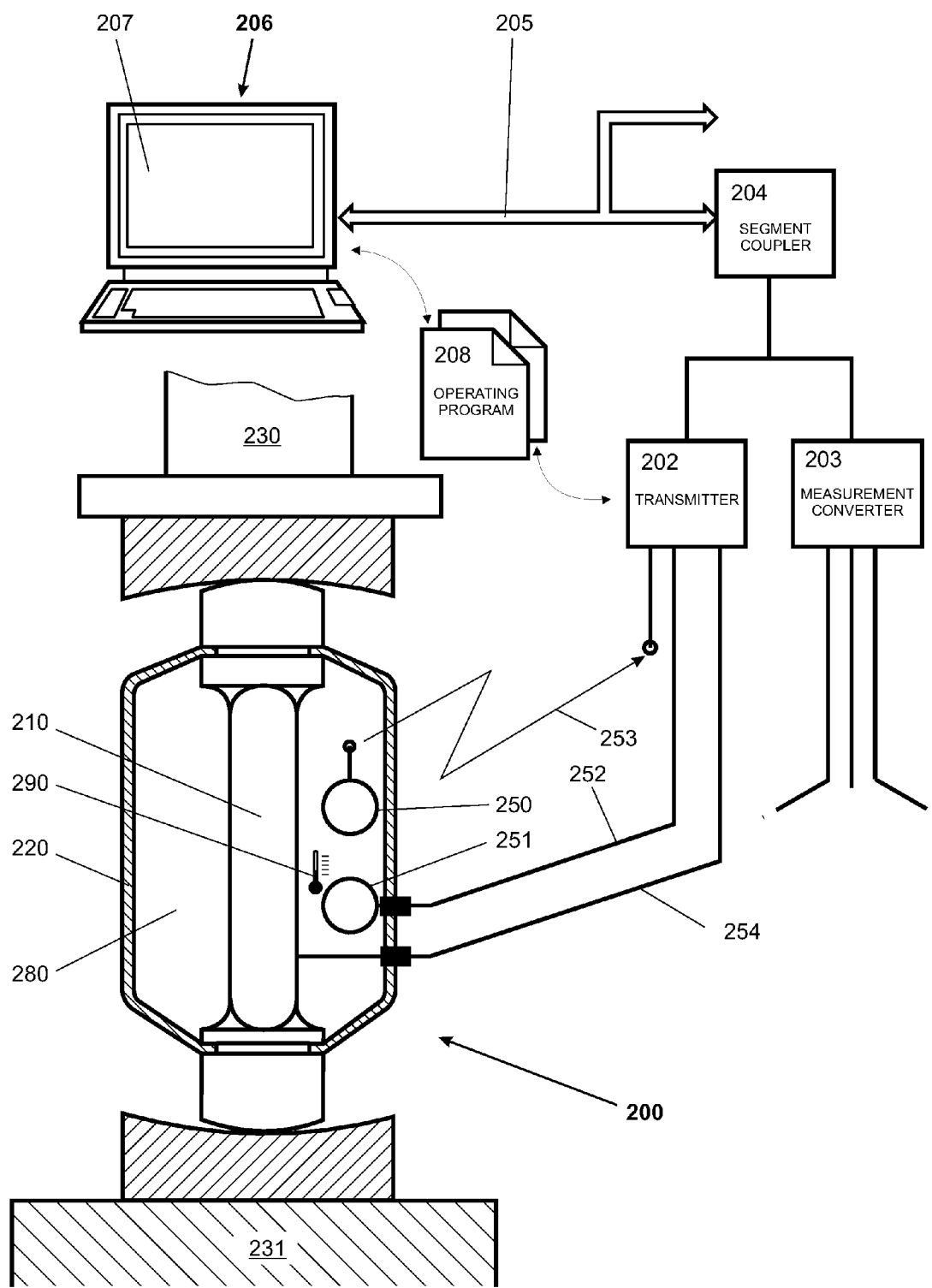
FIG. 3 is a side sectional view of a force-measuring device in the form of a weighing module for a storage tank with a housing that has an interior space and with a force-measuring cell arranged in the housing, wherein the interior space includes at least one sensor operable for carrying out the method, which is connected through connecting devices to an output unit arranged outside of the housing.

FIG. 3 shows a force-measuring device 200 in the form of a tank-weighing module which is monitored in accordance with the inventive method. Tank-weighing modules are used in particular in industrial installations for weighing the contents of basins, tanks, reactor vessels and the like. Normally, for weighing one container, several weighing modules are arranged between the container feet 230 and the foundation 231. Thus, every foot 230 of the container is resting on a force-measuring device 200. In order to determine the weight of the container and/or its content, the signals generated by the force-measuring devices 200 need to be added to each other, as each signal represents a part of the total mass. Therefore, the force-measuring devices 200 in the form of weighing modules normally don't deliver individual outputs. The weighing signals of the individual force-measuring devices 200 of a container are transmitted for example to a computer unit 206 in the form of a lead computer, where they are processed and displayed on the output unit 207 that is incorporated in the lead computer, in most cases as a part of a synoptic system display.

The force-measuring device 200 includes a force-measuring cell 210 which is enclosed by a housing 220. As a rule, the housing 220 is welded to the force-measuring cell and hermetically sealed against the ambient environment of the force-measuring device 200. When the force-measuring device 200 is in place for making measurements, the force-measuring cell 210 as well as the housing 220 is elastically compressed. The influence that the rigidity of the housing has on the weighing signal can be partially compensated, and the hysteresis of the weighing module is negligible in proportion to the measuring range. For the relatively improbable case that high-frequency electromagnetic fields could penetrate into the interior space of the force-measuring cell, there are sensors 250, 251 arranged in the interior space which serve to detect high-frequency electromagnetic fields, with one of the sensors being of a broadband design while the second sensor is designed as a narrowband sensor to cover a specific frequency range, for example the range of common telecommunications devices. These sensors 250, 251 are connected to a computer unit 206 by way of physical connections 252 and/or radio connections 253 and through transmitters 202, measurement converters 203, a segment coupler 204 and a bus system 205. The weighing signal of the force-measuring cell 210 can be transmitted to the computer unit 206 either through these connections or through a dedicated weighing signal connection 254.

The force-measuring device 200 shown in FIG. 3 further includes a temperature sensor 290 in the interior space 280 of the housing 220. The sensors 250, 251, which are operable independently of each other, are transmitting measurement values representing parameters of the interior space to the computer unit 206. The computer unit 206 in FIG. 3 is for example the lead computer of a process control system. Depending on the configuration of the force-measuring device 200 and the computer unit 206, the sensors 250, 251 automatically transmit their sensor signals to the computer unit 206 either continuously or periodically and/or in random intervals or after detecting a change. Of course, the computer unit 206 could also obtain the sensor signals by interrogating the sensors 250, 251 continuously, periodically, or in a random pattern. Since several force-measuring devices 200 are used for one container, the sensor signals of the sensor serving to detect high-frequency electromagnetic fields in one force-measuring device 200 can be verified by comparison with the sensor signals coming from the other force-measuring devices 200. However, it is also possible that the verification values are already stored in the sensor 250, 251 or in the computer unit 206. The verification values can be based for example on published tables whose values were obtained from other instruments or from data published on the Internet. For example, data that are specific to the location where the force-measuring device is installed, such as the ranges of barometric pressure, temperature and radiation, or data about seismic vibrations are known and can be used for the verification of the sensor signals. If a part of the sensor signals are stored in the computer unit 206 in the sense of a device history, an analysis of this history can serve to obtain additional knowledge about the condition of the force-measuring cells 210 as well as of the sensors 251, 252.

The sensors for high-frequency electromagnetic radiation which can be used include any known state-of-the-art sensors that are capable of forming a sensor signal representing the change or the measurement quantity that is to be determined.

The block diagrams in FIGS. 4 to 8 show sensors that serve to detect high-frequency electromagnetic radiation in different configurations and in different arrangements in or on a force-measuring device. Elements of comparable configuration are identified by the same reference symbols in FIGS. 4 to 8 and are not described again for each individual drawing Figure.

Figure 4:
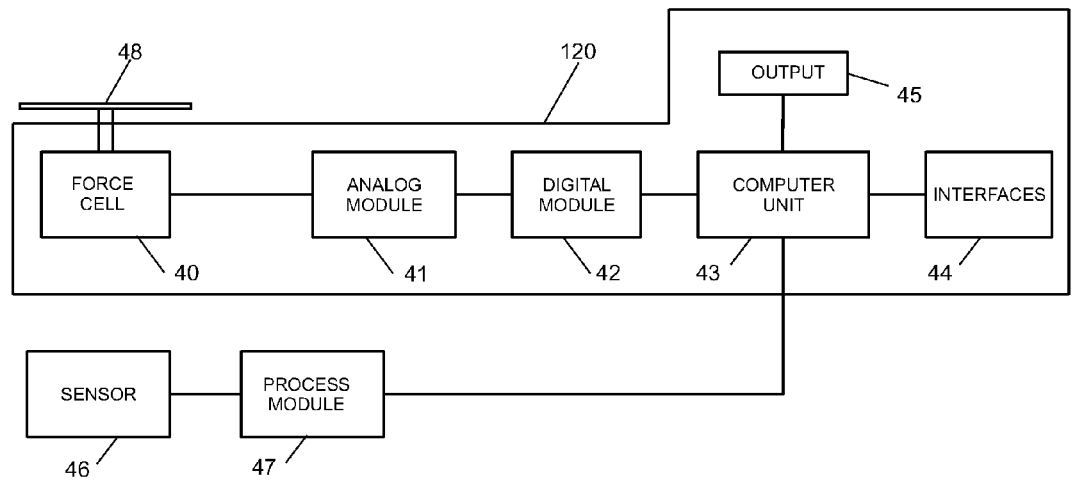
FIG. 4 is a block diagram of a force-measuring device with at least one sensor serving to detect high-frequency electromagnetic fields, in a first configuration.

FIG. 4 shows a block diagram of a force-measuring device in the form of a balance with a force-measuring cell 40 which is coupled to a load receiver 48. The measuring signal of the force-measuring cell 40 is processed through an electronic measurement portion with an analog part 41 and a digital part 42 and the result value is established in a computer unit 43. The result value of the measuring signal is displayed as the mass value of a load by an output unit 45. The result value can also be directed to further uses through interface connections 44 which may be hardware or software interfaces, or the result values can trigger further actions of the balance. One or more sensors 46 serving to detect high-frequency electromagnetic fields can be arranged on the outside of the housing 120 to measure by way of an electronic processing module 47 a parameter that characterizes a high-frequency electromagnetic field if such a field is present. The parameter value to be measured and transmitted to the computer unit 43 is in particular the value of an electromagnetic field strength and/or a frequency. A threshold value which can be predefined and which is stored in a memory unit of the computer unit 43 is now compared to the electromagnetic field strength, in particular at a comparable frequency, and in case of a crossing over the threshold an action of the balance is triggered which can entail that the measurement is repeated and/or an alarm is triggered and/or a measurement process is aborted and/or blocked and/or an operation-readiness indication is turned off and/or the value together with a time value is stored in a log file of the memory unit.

Figure 5:
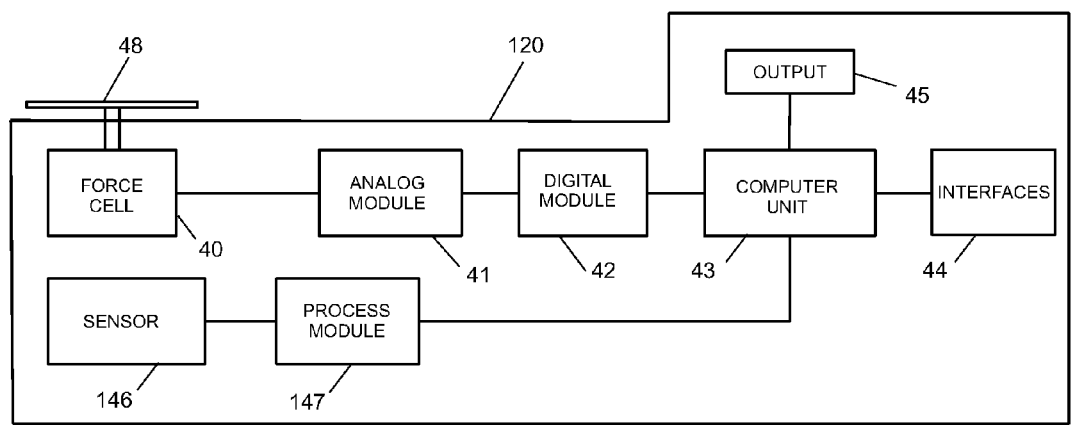
FIG. 5 is a block diagram of a force-measuring device with at least one sensor serving to detect high-frequency electromagnetic fields, in a second configuration.

FIG. 5, in a block diagram analogous to FIG. 4, again shows a balance. One or more sensors 146 serving for the detection of high-frequency electromagnetic fields are arranged inside the housing 120, and a parameter characterizing an existing high-frequency electromagnetic field, in particular a value of an electromagnetic field strength, is determined by way of an electronic processing module 147. The parameter value thus determined is transmitted to the computer unit 43. This value can be determined as a function of the frequency or of a frequency range. A threshold value which can be predefined and stored in a memory unit of the computer unit 43 is compared to the electromagnetic field strength and if a departure beyond the threshold value is found, an action of the balance is triggered as described above.

Figure 6:
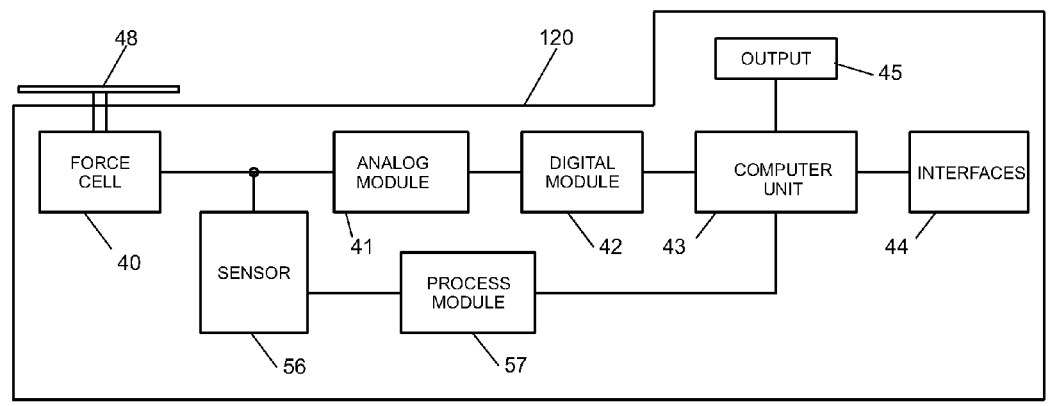
FIG. 6 is a block diagram of a force-measuring device with at least one sensor serving to detect high-frequency electromagnetic fields, in a third configuration.

In the embodiment as illustrated in the block diagram of FIG. 6, the function of the sensor 56 that serves to detect high-frequency electromagnetic fields is implemented by tapping off a high-frequency signal from the measuring signals of the force-measuring cell 40 through inductive and/or capacitative coupling and/or by means of an antenna and to direct the tapped-off signal through an electronic processing module 57 to the computer unit 43. A high-frequency signal of this kind which is superimposed on the actual measuring signal could be an indication of an high-frequency electromagnetic field that could possibly be present in the interior space and exert an excessive and therefore harmful influence on the balance from the outside.

Figure 7:
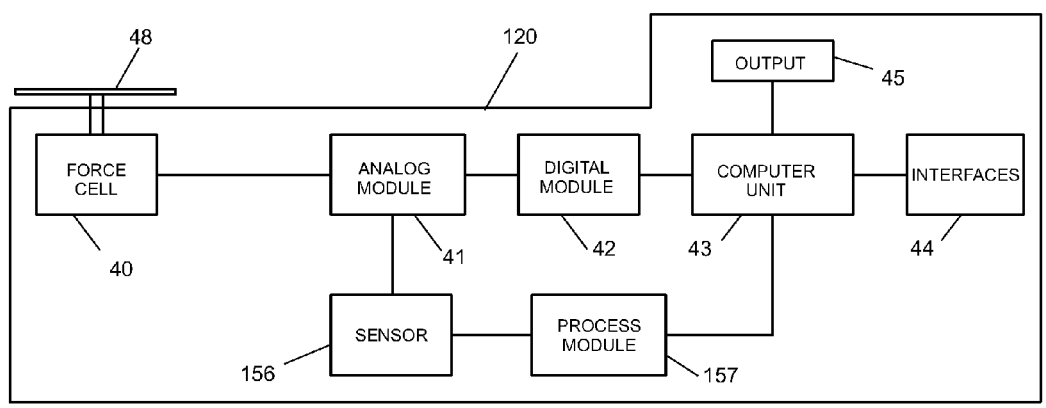
FIG. 7 is a block diagram of a force-measuring device with at least one sensor serving to detect high-frequency electromagnetic fields, in a fourth configuration.

The tapping-off of a high-frequency signal can also occur from the analog electronic module 41 as shown in the block diagram of FIG. 7. Such a signal can furthermore also be tapped off from a power supply line or a connecting lead of the balance.

Figure 8:
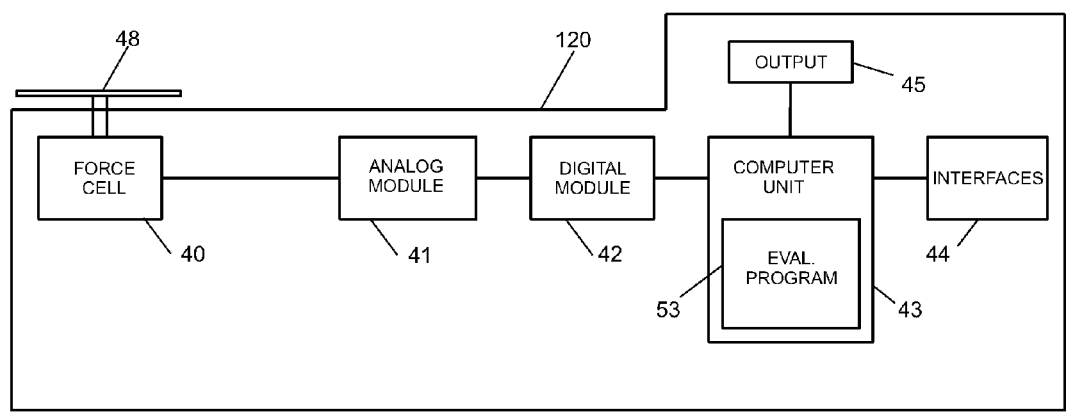
FIG. 8 is a block diagram of a force-measuring device with at least one sensor serving to detect high-frequency electromagnetic fields, in a fifth configuration.

The block diagram of FIG. 8 illustrates how, based on the correlation of the measured values of further sensors, for example a temperature sensor or even the measurement value of the force-measuring device itself, it is possible to check whether a threshold violation by the value of a parameter that characterizes an existing high-frequency electromagnetic field is possibly being caused by high-frequency electromagnetic fields penetrating into the interior space. This requires an evaluation program 53 by means of which such parameter values are compared to threshold values of high-frequency electromagnetic fields which can be predefined at a variable level. An appropriate response action of the balance can likewise be triggered by this special evaluation program 53.

Suitable sensor signals generated by the at least one sensor could also be used for the correction of the measurement result, as a possible way of avoiding the installation of additional measuring sensors of the type which are used according to the present state of the art for example to compensate hysteresis and/or drift phenomena. However, such an approach for the correction of the measurement value and/or the compensation or errors gets quite involved and will not be discussed further here.

The scope of invention exemplified by the embodiments presented in the description should not be limited to the arrangement of only one force-measuring cell in only one housing. As will be readily understood by those acquainted with the pertinent art, the method is equally applicable to arrangements encompassing at least two weighing cells in one housing. Furthermore, the way in which measurements are coordinated with the respective warning signals is irrelevant. The notifications or warnings can occur in real time, i.e. at the time of the respective measurements, or they can also occur at a different time from the respective measurements.

What is claimed is:

1. A method for monitoring and/or determining the condition of a gravimetric measuring instrument comprising at least one housing containing an interior space and at least one force-measuring cell installed in the interior space thereof, and an electronic portion for measuring and/or evaluating a signal, comprising the steps of:
providing a sensor either in the interior space or arranged outside of the housing;
detecting a parameter that characterizes an existing high-frequency electromagnetic field, using the sensor;
comparing a detected value of the parameter to a threshold value, and triggering a response action of the gravimetric measuring instrument when the detected parameter value exceeds the threshold value.

2. The method of claim 1, wherein:
the parameter detected characterizes an electromagnetic field having a frequency in the range of telecommunications equipment.

3. The method of claim 1, wherein:
the parameter detected of the electromagnetic field is at least one of: frequency, frequency range, and field strength.

4. The method of claim 1, wherein:
the comparing step occurs in a computer unit of the gravimetric measuring instrument, where a program contained therein compares the detected value to the threshold value, the threshold value being predefined and stored in a changeable manner in a memory unit of the force-measuring device.

5. The method of claim 1, further comprising the step of:
providing the gravimetric measuring instrument with a memory device and storing the detected value therein for further processing.

6. The method of claim 5, further comprising the steps of:
associating, in the program, a time-related value with each detected value to form a value pair; and
storing each value pair in the memory unit.

7. The method of claim 3, further comprising the step of:
determining the value of the field strength as a function of the frequency or the frequency range of the electromagnetic field.

8. The method of claim 7, further comprising the step of:
providing the gravimetric measuring instrument with a memory unit and storing the determined field strength therein.

9. The method of claim 1, further comprising the step of:
delivering a signal dependent upon the value of the parameter characterizing the high-frequency electromagnetic field to an output unit of the gravimetric measuring instrument, wherein the output unit is at least one of: a display screen, at least one light-emitting diode and a printer.

10. The method of claim 5, wherein:
the response action in the triggering step comprises at least one of the following steps:
repeating the detecting step;
triggering an alarm;
aborting or blocking a measurement process of the gravimetric measuring instrument;
turning off an operation-readiness indicator of the force-measuring device; and
storing the field strength value, with an associated time value, in the memory unit.

11. The method of claim 1, wherein:
the response action further comprises:
blocking the execution of a calibration step until after the detected parameter value returns to a value below the threshold value.

12. The method of claim 4, further comprising the steps of:
monitoring the sensor by the steps of:
transmitting sensor signals to the computer unit;
verifying the sensor signals in the computer unit at least at periodic intervals by comparing the sensor signals to verification values and verification tolerance values that are stored in the memory unit; and
registering an error and signaling the error to an output unit in the event of detecting at least one of: a departure from the verification values and a violation of a predefined verification tolerance value.

13. The method of claim 1, wherein:
the detecting step comprises at least one of:
tapping a signal off of the electronic portion;
measuring an electromagnetic field strength inside or outside of the housing; and
tapping a signal off of a cable connection, preferably from an electric power supply cable and/or a connecting cable.

14. The method of claim 1, further comprising the steps of:
registering a time profile of the detected value over a past time interval;
determining a parameter value from the time profile; and
the response action triggering step comprises using the determined time profile parameter value as a criterion in determining the response action.

15. The method of claim 1, further comprising the steps of:
comparing the detected value of the parameter to an additional threshold value, the additional threshold value being lower than the threshold value and being stored in the computer unit as a modifiable value; and
issuing a warning signal from an output unit when the detected parameter value exceeds the additional threshold value.

16. An instrument for measuring a gravimetric force, comprising:
a housing with an interior space;
a force-measuring cell installed in the interior space,
a sensor for detecting a parameter characterizing a high-frequency electromagnetic field, the electromagnetic field sensor being arranged either in the interior space or outside of the housing; and
an electronic portion for measuring and/or evaluating a signal.

17. The gravimetric measuring instrument of claim 16, wherein:
the electronic portion is connected to the sensor; and
the electronic portion is adapted to trigger a response action of the gravimetric measuring instrument when the signal received from the electromagnetic field sensor indicates that the detected parameter value exceeds a pre-definable threshold value that defines the presence of a high frequency electromagnetic field.

18. The gravimetric measuring instrument of claim 17, wherein the electronic portion further comprises:
a computer unit containing a program; and
a memory unit, wherein, upon receiving a signal from the field sensor indicating that the detected parameter value exceeds a pre-definable threshold value which defines the presence of a high frequency electromagnetic field, the computer unit is operable to execute the program which performs at least one of:
triggers a response action of the gravimetric measuring instrument; and
stores the detected parameter value in the memory unit for further processing.

19. The gravimetric measuring instrument of claim 16, wherein:
the electromagnetic field sensor is configured as an electrical circuit for tapping off a signal of the electronic portion.

20. The gravimetric measuring instrument of claim 16, wherein:
the electromagnetic field sensor is configured as at least one of: a broadband electronic field sensor, a narrowband electromagnetic field sensor and an antenna.

21. The gravimetric measuring instrument of claim 16, wherein:
the electromagnetic field sensor is configured as at least one of a coupling loop and an antenna; and
the electromagnetic field sensor is arranged around a power supply cable;
wherein the coupling loop is at least one of an inductive coupling loop and a capacitative coupling loop; and
wherein the power supply cable supplies at least one of: the force-measuring cell and the electronic measuring portion.

22. The gravimetric measuring instrument of claim 16, further comprising:
at least one of a memory module and a measurement converter, incorporated in the field sensor.

23. The gravimetric measuring instrument of claim 16, further comprising:
a further sensor, adapted for detecting line power peaks in a power supply feeding the force-measuring cell, the power peak sensor being arranged either in the interior space or on the housing.

24. The gravimetric measuring instrument of claim 16, further comprising:
a computer unit containing a program; and
a memory unit,
wherein, upon receiving a signal from the sensor indicating that the detected parameter value exceeds a pre-definable threshold value which defines the presence of a high frequency electromagnetic field, the computer unit is operable to execute the program which performs at least one of:
triggers a response action of the gravimetric measuring instrument; and
stores the detected parameter value in the memory unit for further processing.

25. The method of claim 1, wherein:
the threshold value is set at a level that would be exceeded before the detected high-frequency electromagnetic field would compromise the operation of the force-measuring cell.

* * * * *